United States Patent [19]
Starr

[11] 3,788,699
[45] Jan. 29, 1974

[54] SUPPORT CUSHION FOR CHILDREN'S AND INVALID'S SEATS

[76] Inventor: Fowler K. Starr, 800 S. Third, Kelso, Wash. 98626

[22] Filed: Oct. 26, 1972

[21] Appl. No.: 301,092

[52] U.S. Cl. ..................... 297/390, 5/338, 297/153
[51] Int. Cl. ............................................. A47d 1/00
[58] Field of Search ... 297/390, 384, 135, 148, 153, 297/385, 170; 206/46 FC, 338; 5/327 B, 327 R; 217/53; 220/9 F, 31 S

[56] References Cited
UNITED STATES PATENTS

| | | | |
|---|---|---|---|
| 1,452,911 | 4/1923 | Gronsdahl | 297/390 X |
| 1,776,122 | 9/1930 | Krasnick | 297/390 |
| 2,239,003 | 4/1941 | Jones | 5/327 B |
| 2,429,498 | 10/1947 | Wells | 297/135 |
| 2,979,121 | 4/1961 | Gates | 297/390 X |
| 3,558,186 | 1/1971 | Shore et al. | 297/136 |

Primary Examiner—James T. McCall
Attorney, Agent, or Firm—Eugene D. Farley

[57] ABSTRACT

A support cushion for use in seats such as childrens' high chairs and invalids' wheelchairs having an arm on each side and a cross member across the outer ends of the arms comprises a piece of resiliently compressible material dimensioned to overlie the arms and cross member. The piece has a recess dimensioned to receive the body of the seat occupant. A flange of resiliently compressible material extends downwardly along the lower margin of the recess. In use, the flange compresses into the space between the seat occupant's body and the seat components, bolstering the occupant in an upright position.

5 Claims, 3 Drawing Figures

PATENTED JAN 29 1974　　3,788,699
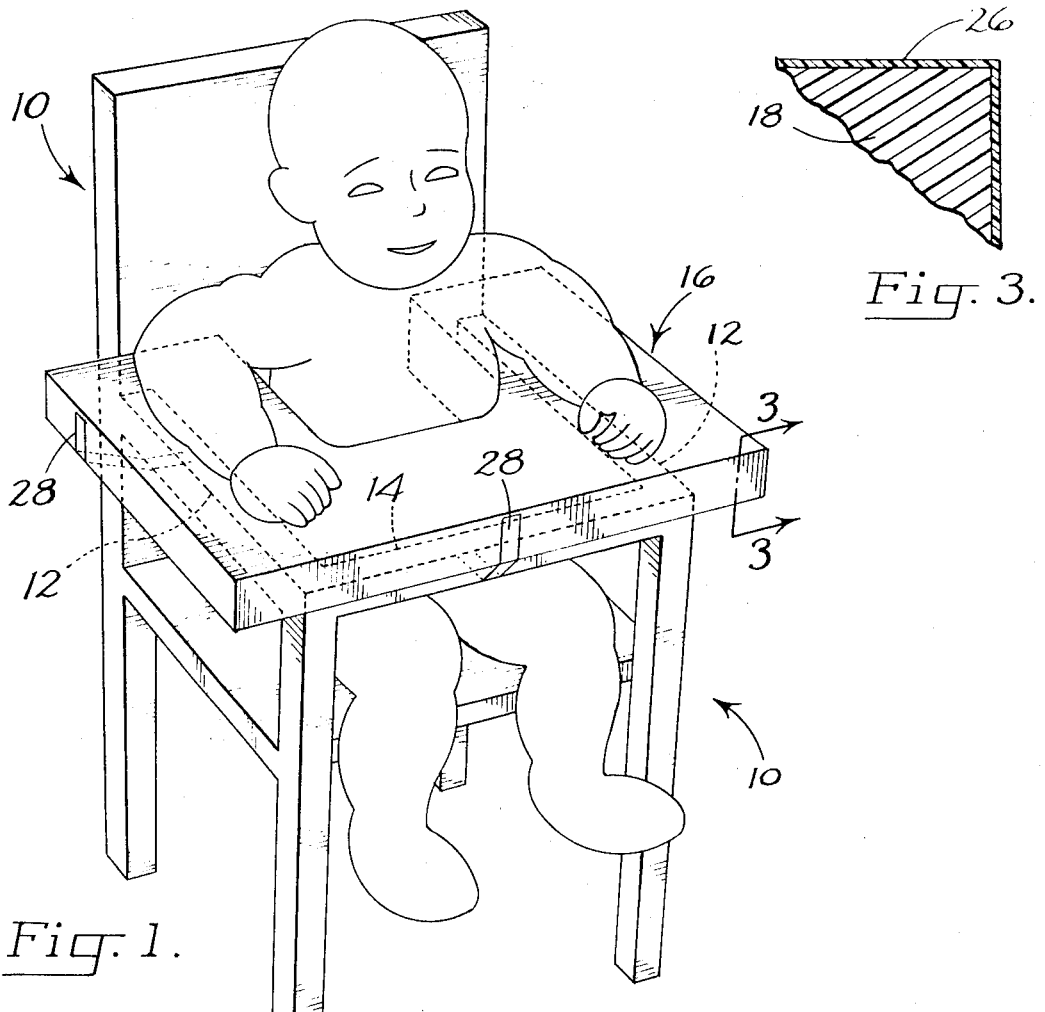
Fig. 1.
Fig. 3.
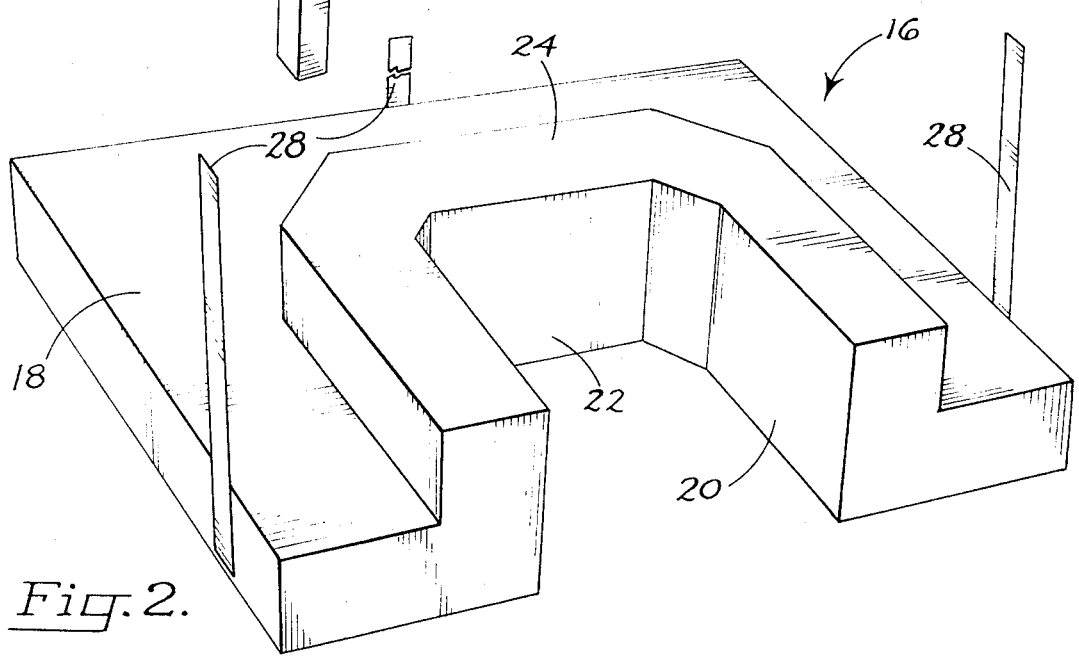
Fig. 2.

SUPPORT CUSHION FOR CHILDREN'S AND INVALID'S SEATS

This invention relates to a support cushion for childrens' and invalids' seats.

Several classes of persons require support in sitting upright. Small infants require such support in sitting upright in highchairs, strollers, walkers, car seats, and the like. Adults who are infirm because of old age, disease, or nervous conditions require support in sitting erect in wheelchairs and other special seats.

It is the general purpose of the present invention to provide for use in such seats a support cushion which provides sufficient support to permit the child or invalid person to sit erect and in comfort without excessive fatigue. This in turn permits him to carry on certain functions such as eating, reading, writing, playing games or otherwise occupying himself over extended periods of time.

A further object of the invention is the provision of a support cushion which has a therapeutic value in assisting the seat occupant to maintain an erect position without slumping or falling over.

Still a further object of the present invention is the provision of a support cushion of the class described which is useful in automobile seats in providing a protective pad around the body of the occupant. This in turn supplies a means of absorbing the high impact load resulting from rapid deceleration of the vehicle occurring in emergency situations or accidents, thereby providing an important safety factor.

Still a further object of the present invention is the provision of a support cushion for childrens' and invalids' seats which is of a simple, unitary construction, which remains securely anchored in place during use, which serves the important ancillary function of providing a table or work surface for the occupant of the seat, and which is of modest cost.

The manner in which the foregoing and other objects of this invention are accomplished will be apparent from the accompanying specification and claims, considered together with the drawings, wherein:

FIG. 1 is a diagrammatic, perspective view of an infant's seat with an infant seated therein, supported by the herein described cushion;

FIG. 2 is an inverted, perspective view of the support cushion; and

FIG. 3 is a fragmentary section taken along line 3—3 of FIG. 1 and illustrating the construction of the cushion.

In its basic concept, the hereindescribed support cushion is adapted for use with a seat having an arm on each side and a cross member across the front of the arms.

The cushion comprises resiliently compressible material and is dimensioned to overlie the arms and cross member of the seat. It has on the side opposite the cross member a recess of sufficient size to receive the body of the seat occupant. It is further provided with a flange of resiliently compressible material extending downwardly along the lower margin of the recess.

In use the cushion is wedged between the body of the seat occupant, the arms, and the cross piece in a compression fit. It thus supports the occupant while at the same time providing an upper work table surface and affording protection from injury.

Considering the foregoing in greater detail and with particular reference to the drawings:

As indicated above, the support cushion of my invention is adapted for use in conjunction with a seat designed to be occupied by an infant or an infirm or older person who cannot sit erect. The chair, indicated schematically at 10, may comprise a high chair, walker, stroller, wheelchair or other seat designed to be occupied by such a person. In all cases, the seat is provided with a pair of arms 12, one on each side, and cross piece 14 which extends between the arms at their outer ends and may interconnect them.

The cross piece may comprise, for example, the tray of a highchair, or a bar transversely connecting the outer ends of the arms of a stroller or wheelchair. It further may comprise a flexible cross piece such as a tightly secured strap or rope extending between the outer ends of the arms.

The presently described support cushion 16 comprises broadly a piece of resiliently compressible material dimensioned to overlie the arms and cross member of the seat. The material employed for this purpose preferably comprises a piece of resiliently compressible foamed plastic or foamed rubber.

The piece is formed with a body 18 having a central recess along its inner margin dimensioned to receive the body of the seat occupant in a snug fit. Although the recess may be variously shaped, it preferably is U-shaped and has a pair of side segments 20 interconnected by a central segment 22.

A flange 24 having substantially the contour of the recess extends downwardly (upwardly in the inverted view of FIG. 2) from the lower margin of the recess. The flange is of sufficient thickness and length so that it may be wedged between the body of the seat occupant and the arms and cross member of the seat in a snug, compression fit.

Preferably the overlying body piece and the depending flange are formed integrally. The cushion thus may be manufactured easily from relatively low cost material.

In a preferred form of the invention, the upper surface of the overlying body portion is planar. This provides a table top surface which is useful to the chair occupant in eating and performing various activities such as reading, writing, playing games, etc. Where such activities are contemplated, the cushion is provided with an overlying impervious, durable cover 26 of suitable plastic or equivalent material.

Also, when the cushion is to be used with active infants it is desirable particularly to provide it with one or more straps 28 attached to the cushion at strategic locations and designed to secure the cushion to selected structural components of the seat.

In use, the occupant is placed in the seat in the usual posture with seat arms 12 at his side and connecting cross piece 14 infront of him. The cushion 16 then is placed about his body with flange 24 wedged in a compression fit between his body and the inner faces of arms 12 and cross member 14. If present, straps 28 are affixed to the appropriate seat components.

When thus installed, the cushion supports the occupant of the seat in a comfortable position, enabling him to sit upright for long periods of time without fatigue. It also provides a work surface for his convenience and entertainment. It elevates a child so that he has a clear view of his surroundings. Still further, in particular where the cushion is applied to a car seat, the padding of the cushion affords a very material protection in the event of an emergency stop or accident.

Having thus described my invention in preferred embodiments, I claim:

1. In combination with a seat having an arm on each side and a cross member across the outer ends of the arms, a support cushion enabling a child or invalid to sit upright in the seat and comprising:
   a. a piece of resiliently compressible material dimensioned to overlie the arms and cross member of the seat;
   b. the piece having on the side opposite the cross member a recess to receive the body of a child or invalid sitting in the seat,
   c. a flange of resiliently compressible material extending downwardly along the lower margin of the recess,
   d. the piece and flange being dimensioned to provide a compression fit between the arms, the cross member, and the body of the seat occupant.

2. The support cushion of claim 1 wherein the upper surface of the piece of resiliently compressible material is planar and of a character adapted to provide a table top.

3. The support cushion of claim 1 wherein the resiliently compressible material is foamed plastic or foamed rubber.

4. The support cushion of claim 1 wherein the piece of resiliently compressible material and flange comprise an integral piece of foamed rubber or plastic.

5. The support cushion of claim 1 including strap means fastened at one end to the support cushion and adapted to secure the seat in preselected locations.

* * * * *